(12) United States Patent
Lu et al.

(10) Patent No.: US 12,166,634 B2
(45) Date of Patent: Dec. 10, 2024

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 286 days.

(21) Appl. No.: 17/685,222

(22) Filed: Mar. 2, 2022

(65) Prior Publication Data

US 2022/0191098 A1    Jun. 16, 2022

Related U.S. Application Data

(63) Continuation of application No. PCT/CN2019/108415, filed on Sep. 27, 2019.

(51) Int. Cl.
*H04L 41/08* (2022.01)
*H04W 76/30* (2018.01)
*H04W 76/27* (2018.01)

(52) U.S. Cl.
CPC ......... *H04L 41/0886* (2013.01); *H04W 76/30* (2018.02); *H04W 76/27* (2018.02)

(58) Field of Classification Search
CPC ......... H04L 41/12; H04L 45/02; H04L 45/00; H04L 45/04; H04L 41/0886; H04W 84/18; H04W 76/30; H04W 76/27

USPC .......................................................... 370/254
See application file for complete search history.

(56) References Cited

U.S. PATENT DOCUMENTS

| 2015/0124735 | A1  | 5/2015  | Cho |
|---|---|---|---|
| 2017/0285177 | A1* | 10/2017 | Jin ........................... G01S 19/42 |
| 2018/0048994 | A1* | 2/2018  | Kwon .................... H04W 4/021 |
| 2019/0158993 | A1* | 5/2019  | Kwon ..................... H04L 5/001 |

(Continued)

FOREIGN PATENT DOCUMENTS

| CN | 105025593 A | 11/2015 |
|---|---|---|
| CN | 105704641 A | 6/2016 |
| CN | 106233696 A | 12/2016 |

(Continued)

OTHER PUBLICATIONS

3GPP TSG-RAN WG2 #83, Barcelona, Spain, Aug. 19-23, 2013, R2-132494, Agenda Item: 7.5.2, Source: LG Electronics Inc., Title: L2 Protocols for D2D. (Year: 2013).*

(Continued)

*Primary Examiner* — Peter G Solinsky
*Assistant Examiner* — Sanjay K Dewan
(74) *Attorney, Agent, or Firm* — PERKINS COIE LLP

(57) ABSTRACT

A wireless communication method and a terminal device. The method comprises: a first terminal triggering, according to first indication information sent by a second terminal, at least one of the following items to perform configuration of parameters: a packet data convergence protocol (PDCP) reconstruction process or a PDCP data recovery process, a radio link control (RlX) reconstruction process, a media access control (MAC) resetting process, and a full configuration process.

12 Claims, 4 Drawing Sheets

200

A first terminal triggers at least one of the following processes to configure an Access Stratum parameter according to first indication information sent by a second terminal: a Packet Data Convergence Protocol (PDCP) reconstruction process or a PDCP data recovery process, a Radio Link Control (RLC) reconstruction process, a Media Access Control (MAC) resetting process, and a full configuration process — S210

(56) References Cited

U.S. PATENT DOCUMENTS

2022/0159625 A1* 5/2022 Park .................... H04W 4/40
2024/0015834 A1* 1/2024 You .................... H04W 76/27

FOREIGN PATENT DOCUMENTS

| EP | 3 606 001 A1 * | 2/2020 | ............ H04L 29/06 |
| WO | 2014007494 A1 | 1/2014 | |
| WO | WO 2014/113686 A2 * | 1/2014 | ............ H04W 16/32 |
| WO | WO 2019/066558 A1 * | 4/2019 | ............ H04L 1/18 |
| WO | WO 2021/029999 A1 * | 2/2021 | ............ H04W 76/15 |
| WO | WO 2021/052194 A1 * | 3/2021 | ............ H04W 76/23 |

OTHER PUBLICATIONS

3GPP TSG-RAN WG2 Meeting #105bis, Xi'an, China, Apr. 8-12, 2019, R2-1904721, Agenda Item: 11.4.4, Source: Qualcomm Incorporated, Title: Discussion on PC5-RRC and PC5-S. (Year: 2019).*

Office Action of the EP application No. 19947191.3, issued on Apr. 24, 2023. 6 pages.

Office Action of the JP application No. 2022-515687, issued on Apr. 11, 2023. 10 pages with English translation.

First Office Action of the CN application No. 202210123344.6, issued on Apr. 8, 2023. 13 pages with English translation.

Second Office Action of the CN application No. 202210123344.6, issued on Jun. 27, 2023. 11 pages with English translation.

International Search Report Mailed Jun. 23, 2020 in Application No. PCT/CN2019/108415.

LG Electronics Inc., L2 Protocols for D2D, 3GPP TSG-RAN WG2 #83, R2-132494, Barcelona, Spain, Aug. 19-23, 2013, 3 pages.

Vodafone, New SID: Study on NR V2X, 3GPP TSG RAN Meeting #80 RP-181480 (RP-181429), La Jolla, USA, Jun. 11-14, 2018, 5 pages.

Summons to attend oral proceedings of European application No. 19947191.3 issued on Oct. 31, 2023, 7 pages.

Decision of rejection of Chinese application No. 202210123344.6 issued on Oct. 13, 2023, 6 pages with English translation.

Extended European Search Report for European Application No. 19947191.3 issued Aug. 19, 2022. 9 pages.

Qualcomm Incorporated "Discussion on PC5-RRC and PC5-S" R2-1904721; 3GPP TSG RAN WG2 Meeting #105bis; Xi'an, China; Apr. 8-12, 2019. 5 pages.

Examination Report for Indian Application No. 202227022349 issued Jan. 6, 2023. 6 pages with English translation.

Examiners call and proposed amendment of the EP application No. 19947191.3, issued on Feb. 19, 2024. 6 pages.

Result of consultation of the EP application No. 19947191.3, issued on Feb. 29, 2024. 5 pages.

Hearing notice of Indian application No. 202227022349 issued on Aug. 19, 2024, 2 pages.

* cited by examiner

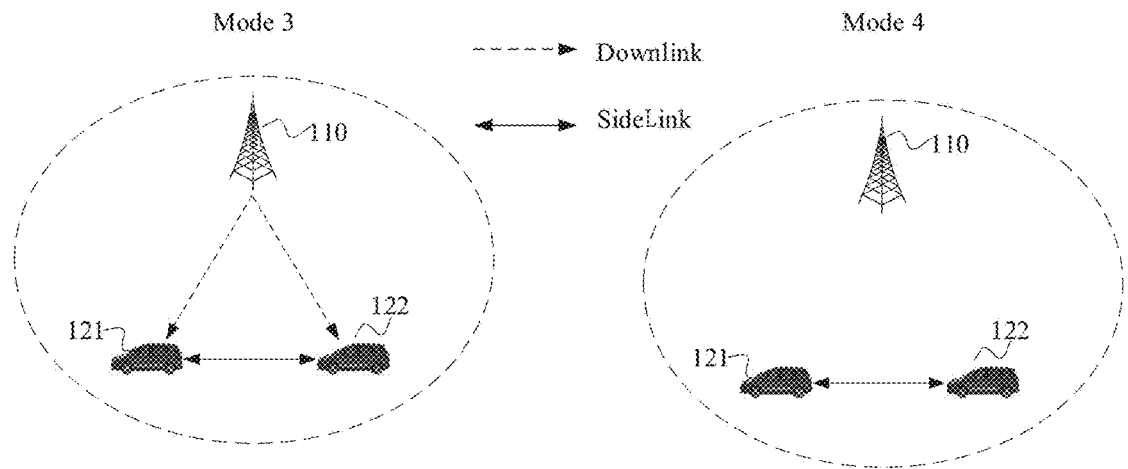

A first terminal triggers at least one of the following processes to configure an Access Stratum parameter according to first indication information sent by a second terminal: a Packet Data Convergence Protocol (PDCP) reconstruction process or a PDCP data recovery process, a Radio Link Control (RLC) reconstruction process, a Media Access Control (MAC) resetting process, and a full configuration process — S210

A second terminal sends first indication information to a first terminal when there is change in an Access Stratum parameter, wherein the first indication information is used for triggering the first terminal to perform at least one of the following processes to configure the Access Stratum parameter: a Packet Data Convergence Protocol (PDCP) reconstruction process or a PDCP data recovery process, a Radio Link Control (RLC) reconstruction process, a Media Access Control (MAC) resetting process, and a full configuration process — S310

FIG. 3

WIRELESS COMMUNICATION METHOD AND TERMINAL DEVICE

CROSS-REFERENCE TO RELATED APPLICATION

The present application is a continuation application of International PCT Application No. PCT/CN2019/108415, filed on Sep. 27, 2019, the entire content of which is hereby incorporated by reference.

TECHNICAL FIELD

Embodiments of the present application relate to the field of communication, and more particularly, to a wireless communication method and a terminal device.

BACKGROUND

An Internet of Vehicles system is a SideLink (SL) transmission technology based on Long Term Evaluation Vehicle to Vehicle (LTE V2V). Different from a traditional LTE system in which communication data is received or sent through a base station, the Internet of Vehicles system adopts a direct Device to Device (D2D) communication mode. Therefore, the Internet of Vehicles system has a higher spectrum efficiency and a lower transmission delay.

In the Internet of Vehicles system, a terminal device may be in different scenarios, for example, a scenario without cellular network coverage and a scenario with cellular network coverage, and the terminal device may be in different states, such as an Idle state, an inactive state, or a connected state. Thereby, an Access Stratum configuration of the terminal device may come from different configurations, such as system information or dedicated signaling. Different configurations may cause change in a parameter of a sender and affect reception of a receiver. Therefore, how to update a transmission parameter to ensure data transmission is an urgent problem to be solved.

SUMMARY

Embodiments of the present application provide a wireless communication method and a terminal device, which are beneficial to ensure timely update of a transmission parameter.

In a first aspect, there is provided a wireless communication method, including: triggering, by a first terminal, at least one of the following processes to configure an Access Stratum parameter according to first indication information sent by a second terminal: a Packet Data Convergence Protocol (PDCP) reconstruction process or a PDCP data recovery process, a Radio Link Control (RLC) reconstruction process, a Media Access Control (MAC) resetting process, and a full configuration process.

In a second aspect, there is provided a wireless communication method, including: sending, by a second terminal, first indication information to a first terminal when there is change in an Access Stratum parameter, wherein the first indication information is used for triggering the first terminal to configure the Access Stratum parameter by performing at least one of the following: a Packet Data Convergence Protocol (PDCP) reconstruction process or a PDCP data recovery process, a Radio Link Control (RLC) reconstruction process, a Media Access Control (MAC) rescuing process, and a full configuration process.

In a third aspect, there is provided a terminal device, which is configured to perform the method in the first aspect or any possible implementation of the first aspect. Specifically, the terminal device includes units for performing the method in the first aspect or any possible implementation of the first aspect.

In a fourth aspect, there is provided a terminal device, which is configured to perform the method in the second aspect or any possible implementation of the second aspect. Specifically, the terminal device includes units for performing the method of the second aspect or any possible implementation of the second aspect.

In a fifth aspect, there is provided a terminal device, which includes: a processor and a memory. The memory is configured to store a computer program, and the processor is configured to call and run the computer program stored in the memory to perform the method in the first aspect or any of various implementations thereof.

In a sixth aspect, there is provided a terminal device is provided, which includes: a processor and a memory. The memory is configured to store a computer program, and the processor is configured to call and run the computer program stored in the memory to perform the method in the second aspect or any of various implementations thereof.

In a seventh aspect, there is provided a chip for implementing the method according to any one of the first and second aspects or any of various implementations thereof Specifically, the chip includes a processor configured to call and run a computer program from a memory to enable a device installed with the chip to perform the method according to any one of the first and second aspects or any of various implementations thereof.

In an eighth aspect, there is provided a computer readable storage medium for storing a computer program that enables a computer to perform the method according to any one of the first and second aspects or any of various implementations thereof.

In a ninth aspect, there is provided a computer program product, which includes computer program instructions, the computer instructions enable a computer to perform the method according to any one of the first and second aspects or any of various implementations thereof.

In a tenth aspect, there is provided a computer program, when the computer program is run on a computer, the computer program enables the computer to perform the method according to any one of the first and third aspects or any of various implementations thereof.

Based on the above technical solutions, when there is change in an Access Stratum parameter, a sender device may send first indication information to a receiver device to trigger the receiver device to configure the Access Stratum parameter. Correspondingly, the receiver device may receive the first indication information sent by the sender device and further configure the Access Stratum parameter according to the first indication information, which is beneficial to ensure consistency of Access Stratum parameters of the sender device and the receiver device, thus maintaining normal transmission of data.

BRIEF DESCRIPTION OT DRAWINGS

FIG. 1 is a schematic diagram of an application scenario according to an embodiment of the present application.

FIG. 2 is a schematic diagram of a wireless communication method according to an embodiment of the present application.

FIG. 3 is a schematic diagram of another wireless communication method according to an embodiment of the present application.

DETAILED DESCRIPTION

Figure 4:
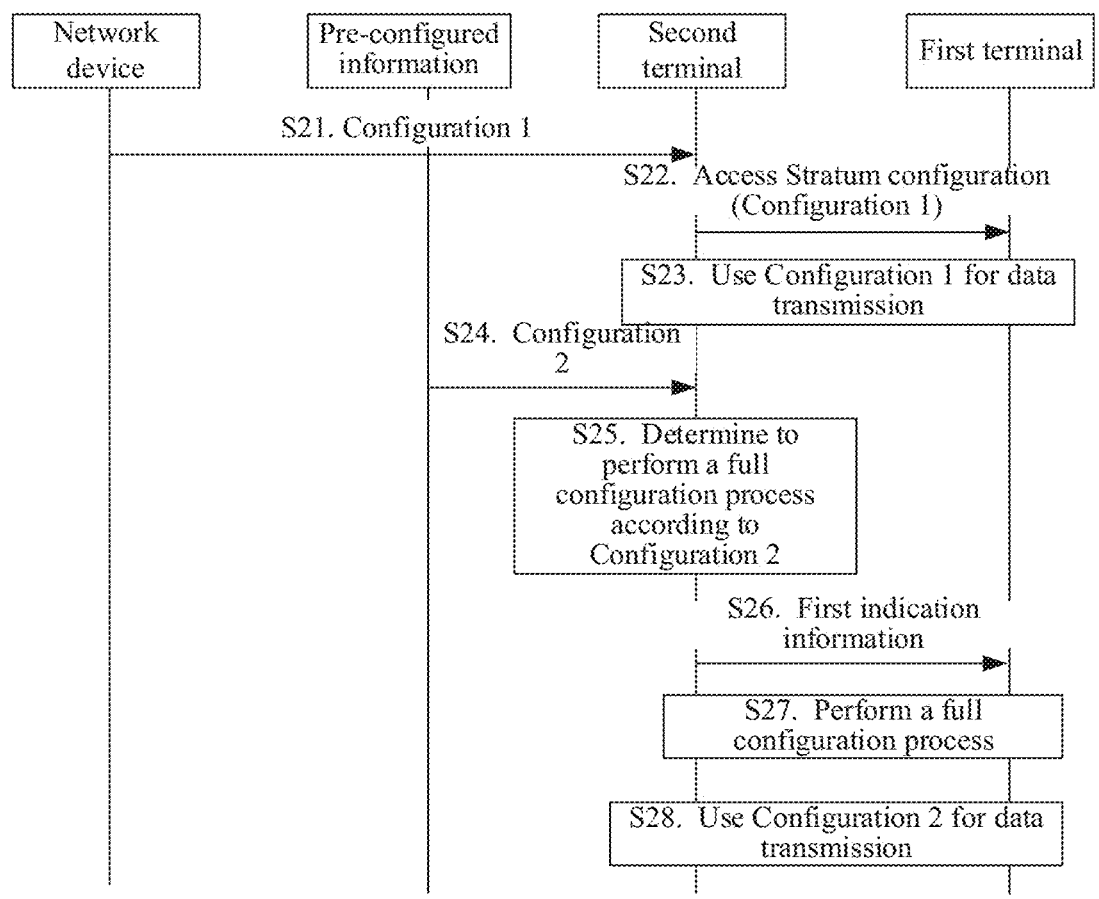
FIG. 4 is a schematic interaction diagram of a wireless communication method according to an embodiment of the present application.

Technical solutions in embodiments of the present application will be described below with reference to the drawings in the embodiments of the present application. It is apparent that the embodiments described are just a part of embodiments of the present application, but not all of the embodiments of the present application. According to the embodiments of the present application, all other embodiments achieved by a person of ordinary skill in the art without making inventive efforts belong to the protection scope of the present application.

It should be understood that the technical solutions of the embodiments of the present application may be applied to a Device to Device (D2D) communication system, such as an Internet of Vehicles system based on Long Term Evolution (LTE) for D2D communication, or a New Radio-Vehicle to Everything (NR-V2X) system. Unlike a traditional LTE system in which communication data is received or sent between terminals through a network device (e.g., a base station), an Internet of Vehicles system adopts a direct D2D communication mode, therefore, has a higher spectrum efficiency and a lower transmission delay.

Optionally, a communication system on which an Internet of Vehicles system is based may be a Global System of Mobile communication (GSM) system, a Code Division Multiple Access (CDMA) system, a Wideband Code Division Multiple Access (WCDMA) system, a General Packet Radio Service (CPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, and a 5G New Radio (NR) system, etc.

A network device in the embodiments of the present application may be a base transceiver station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAM), or the network device may be a mobile switching center, a relay station, an access point, a vehicle-mounted device, a wearable device, a hub, a switch, a bridge, a router, a Network Side Device (gNB) in an NR network, or a network device in a future evolved Public Land Mobile Network (PLMN).

A terminal device in the embodiments of the present application may be a terminal device capable of implementing D2D communication. For example, it may be a vehicle-mounted terminal device, or a terminal device (LTE UF) in an LTE system, or a terminal device (NR UE) in an NR network, or a terminal device in a future evolved Public Land Mobile Network (PLMN), which is not limited in the embodiments of the present application.

FIG. 1 is a schematic diagram of an application scenario according to an embodiment of the present application. FIG. 1 illustrates exemplarily one network device and two terminal devices. Optionally, a wireless communication system in an embodiment of the present application may include a plurality of network devices, and other numbers of terminal devices may be included within a coverage area of each network device, which is not limited in the embodiments of the present application.

Optionally, the wireless communication system may further include other network entities such as a Mobile Management Entity (MME), a Serving Gateway (S-GW), a Packet Data Network Gateway (P-GW), or the wireless communication system may further include other network entities such as a Session Management Function (SMF), a Unified Data. Management (UDM), an Authentication Server Function (AUSF), which is not limited in the embodiments of the present application.

In the Internet of Vehicles system, a terminal device may perform communication using mode 3 and mode 4.

Specifically, a terminal device 121 may communicate with a terminal device 122 through a D2D communication mode. During D2D communication, the terminal device 121 communicates with the terminal device 122 directly through a D2D link, that is, a SideLink (SL). In mode 3, a transmission resource of a terminal device is allocated by a base station, and the terminal device may send data on an SL according to the resource allocated by the base station. The base station may allocate a resource for single transmission for a terminal device, or may allocate a resource for semi-static transmission for the terminal device. In mode 4, a terminal device selects a transmission resource on SL resources autonomously. Specifically, a terminal device acquires an available transmission resource in a resource pool by listening, or the terminal device selects randomly a transmission resource from the resource pool.

It should be understood that mode 3 and mode 4 described above are merely illustrative of two transmission modes, and other transmission modes may be defined. For example, mode 1 and mode 2 are introduced into NR-V2X. Mode 1 indicates that a SideLink transmission resource of a terminal device is allocated by a base station. The base station uses mode 3 and mode 1 to allocate SideLink transmission resources in different manners. For example, one of the manners may be a dynamic scheduling manner; the other is a semi-static scheduling manner or a semi-static plus dynamic scheduling manner. Mode 2 indicates that a SideLink transmission resource of a terminal device is selected by a terminal.

A D2D communication technology may be applied to Vehicle to Vehicle (V2V) communication or Vehicle to Everything (V2X) communication. In the V2X communication, X may generally refer to any device with wireless receiving and sending capabilities, such as, but not limited to, a slow-moving wireless apparatus, a fast-moving vehicle-mounted device, or a network control node with wireless transmitting and receiving capabilities. It should be understood that the embodiments of the present application are mainly applied to a V2X communication scenario, but may also be applied to any other D2D communication scenarios, which is not limited in the embodiments of the present application.

It should be understood that the terms "system" and "network" are often used interchangeably herein. The term "and/or" herein is an association relationship describing associated objects only, indicating that three relationships may exist, for example, A and/or B may indicate three cases: A alone, both A and B, and B alone. In addition, the symbol "/" in this document generally indicates that objects before and after the symbol "/" have an "or" relationship.

In the Internet of Vehicles system, for a configuration of an Access Stratum parameter, the configuration may be performed by centering on a sender terminal.

For example, when a sender terminal is in an area without cellular network coverage, a sender terminal may configure an Access Stratum according to a pre-configured parameter.

For another example, when a sender terminal is in a cellular coverage area and the sender terminal is in an Idle state or an Inactive state, the sender terminal may configure an Access Stratum according to a configuration in a system message.

For another example, when a sender terminal is in a cellular coverage area and the sender terminal is in a connected state, the sender terminal may configure an Access Stratum according to a configuration in a dedicated Radio Resource Control (RRC) signaling.

It may be seen that when a sender terminal switches between different coverage scenarios or different states, its Access Stratum configuration may come from different configurations, and parameter settings of different configurations are different, which may lead to change in a parameter of a sender, and some changes in parameters of the sender may affect reception at a receiver. For example, a Packet Data Convergence Protocol (PDCP) Serial Number (SN) size and a Max Context Identity (MaxCID), etc., are both sending parameters and receiving parameters.

The above parameters may not be modified in real time during data transmission, thus causing data transmission errors. Therefore, how to update a parameter to ensure data transmission is an urgent problem to be solved.

FIG. 2 is a schematic flow chart of a wireless communication method 200 according to an embodiment of the present application. The method 200 may be performed by a terminal device in the communication system shown in FIG. 1. As shown in FIG. 2, the method 200 may include at least portion of the following contents.

In S210, a first terminal triggers at least one of the following processes to configure an Access Stratum parameter according to first indication information sent by a second terminal: a Packet Data Convergence Protocol (PDCP) reconstruction process or a PDCP data recovery process; a Radio Link Control (RLC) reconstruction process; a Media Access Control (MAC) resetting process; and a full configuration process.

In the embodiment of the present application, the second terminal may be a sender terminal, and the first terminal may be a receiver terminal. When it is determined that there is change in an Access Stratum parameter, the second terminal may send first indication information to the first terminal to indicate the first terminal to reconfigure a receiving parameter. Specifically, the first indication information may indicate the first terminal to trigger at least one of the following processes to reconfigure the receiving parameter: a PDCP reconstruction process or a PDCP data recovery process, a Radio Link Control (RLC) reconstruction process, a Media Access Control (MAC) reconfiguration process, and a full configuration process.

It shall be understood that the Access Stratum parameter in the embodiment of the present application may include a sending parameter and/or a receiving parameter for data transmission.

It shall be understood that in the embodiment of the present application, a sending parameter may refer to a parameter for data sending. In some cases, the sending parameter may also be used for data reception, that is, the sending parameter is also a receiving parameter. Similarly, a receiving parameter may also be referred to as a parameter for data reception. In some cases, the receiving parameter may also be used for data sending, that is, the receiving parameter is also a sending parameter.

In some embodiments of the present application, the full configuration process may include at least one of the following: a PDCP reconstruction process or a PDCP data recovery process, an RLC reconstruction process, and a MAC resetting process.

In some other embodiments of the present application, the full configuration process includes at least one of the following: releasing at least one of current dedicated radio configurations; releasing at least one of common radio configurations; applying a default configuration of at least one Access Stratum parameter; releasing at least one Service Data Adaptation Protocol (SLAP) entity; and releasing at least one bearer.

Here, the applying the default configuration of the at least one Access Stratum parameter may refer to using the default configuration of the at least one Access Stratum parameter for data sending or reception, the at least one Access Stratum parameter may include at least one receiving parameter and/or at least one sending parameter.

The default configuration of the at least one Access Stratum parameter may be predefined, pre-configured, or from a system message.

That is to say, a predefined configuration may include a configuration of the at least one Access Stratum parameter. When a full configuration process is performed, the configuration of the at least one Access Stratum parameter in the predefined configuration may be used, that is, a current configuration of the at least one Access Stratum parameter is updated to a predefined configuration of the at least one Access Stratum parameter. Or, pre-configured information may include a configuration of the at least one Access Stratum parameter, and when a full configuration process is performed, the configuration of the at least one Access Stratum parameter in the pre-configured information may be used, that is, a current configuration of the at least one Access Stratum parameter is updated to the configuration of the at least one Access Stratum parameter in the pre-configured information. Or, a system message may include a configuration of the at least one Access Stratum parameter, and when a full configuration process is performed, the configuration of the at least one Access Stratum parameter in the system message may be used, that is, a current configuration of the at least one Access Stratum parameter is updated to the configuration of the at least one Access Stratum parameter in the system message.

Optionally, the predefined configuration may be agreed in a protocol, and the pre-configured information may be preset in the terminal device, for example, preset in a Subscriber Identification Module (SIM) card of the terminal device, and the terminal device may obtain the pre-configured information from the SIM card.

In some embodiments, releasing or clearing at least one of the current dedicated radio configurations may include releasing other dedicated radio configurations other than a specific configuration in the current dedicated radio configurations, wherein the specific configuration includes a Cell Radio Network Temporary Identity (C-RNTI) of a Master Cell Group (MCG) and/or an Access Stratum (AS) security configuration associated with a master key.

That is to say, when the full configuration process is performed, the first terminal may release other dedicated radio configurations other than the specific configuration in the current dedicated radio configurations, and only remain the specific configuration.

Optionally, in some embodiments, the first indication information may be used for explicitly indicating the first terminal to perform at least one of the following processes: a Packet Data Convergence Protocol (PDCP) reconstruction process or a PDCP data recovery process; a Radio Link Control (RLC) reconstruction process; a Media Access Control (MAC) resetting process; and a full configuration process.

The following description will take an example that when there is change in an Access Stratum parameter, first indication information indicates to perform a full configuration process to configure the Access Stratum parameter, but the embodiment of the present application is not limited to this.

Specifically, the first terminal may receive the first indication information, which may explicitly indicate the first terminal to trigger the full configuration process, that is, when receiving the first indication information, the first terminal may trigger the full configuration process according to the first indication information to update an Access Stratum parameter.

In some embodiments, the first indication information may be carried in an RRC signaling. For example, the first indication information may be a specific bit in the RRC signaling, and a value of the specific bit is used for indicating whether to trigger the first terminal to perform the full configuration process. For example, the specific bit may be 1 bit, a value of 0 for the 1 bit indicates that the first terminal is not triggered to perform the full configuration process, and a value of 1 indicates that the first terminal is triggered to perform the full configuration process.

Optionally, in other embodiments, the first indication information may implicitly indicate the first terminal to trigger the full configuration process to configure an Access Stratum parameter. As an example, the first indication information may be used for indicating change in an Access Stratum parameter, for example, the first indication information may be used for indicating: a change amount of an Access Stratum parameter, a configuration of an updated Access Stratum parameter, or there is change in an Access Stratum parameter. After receiving the first indication information, the first terminal may determine that there is change in an Access Stratum parameter, and may further trigger the full configuration process to update the Access Stratum parameter.

Optionally, the Access Stratum parameter may include at least one of the following parameters: a Service Data Adaptation Protocol (SDAP) parameter, a PDCP parameter, and an RLC parameter.

As an example and not a limitation, the SDAP parameter includes at least one of the following: a Protocol Data Unit (PDU) session identifier, a SDAP header configuration, a default data bearer, and a mapping relationship from data flow to bearer.

As an example and not a limitation, the PDCP parameter includes at least one of the following: a PDCP serial number size, a PDCP header compression configuration, an integrity protection related configuration, and an encryption and decryption related configuration.

As an example and not a limitation, the PDCP header compression configuration may include at least one of: whether to perform compression, a maxCID, a header compression algorithm (e.g., profile), a header compression mode (e.g., Robust Header Compression (ROHC)), etc.

Optionally, the RLC parameter includes at least one of the following: an RLC mode, an RLC serial number length, and a logical channel ID.

It should be understood that the above Access Stratum parameters are only examples, and in other embodiments, the Access Stratum parameter may also include other parameters for data sending and reception, which is not limited in the embodiments of the present application.

Therefore, in the embodiment of the present application, when there is change in an Access Stratum parameter of a sender, a receiver may configure the Access Stratum parameter based on first indication information sent by the sender, thus ensuring consistency of Access Stratum parameters of the sender and the receiver, and further ensuring reliable data transmission.

A wireless communication method according to an embodiment of the present application is described in detail from perspective of a first terminal above with reference to FIG. 2, and a wireless communication method according to another embodiment of the present application is described in detail from perspective of a second terminal below with reference to FIG. 3. It should be understood that the description on a second terminal side and the description on a first terminal side correspond to each other, and similar descriptions may refer to the above description, which will not be repeated here to avoid repetition.

FIG. 3 is a schematic flow chart of a wireless communication method 300 according to another embodiment of the present application. The method 300 may be performed by a terminal device in the communication system shown in FIG. 1. As shown in FIG. 3, the method 300 includes following contents.

In S310, a second terminal sends first indication information to a first terminal when there is change in an Access Stratum parameter, wherein the first indication information is used for triggering the first terminal to perform at least one of the following processes to configure the Access Stratum parameter: a Packet Data Convergence Protocol (PDCP) reconstruction process or a PDCP data recovery process; a Radio Link Control (RLC) reconstruction process; a Media Access Control (MAC) resetting process; and a full configuration process.

Optionally, the second terminal may determine that there is change in the Access Stratum parameter under at least one of the following situations: the second terminal moves from an area with cellular network coverage to an area without cellular network coverage; the second terminal moves from an area without cellular network coverage to an area with cellular network coverage; in a case of cellular network coverage, the second terminal is in an idle state or an Inactive state, and the second terminal performs cell reselection, for example, switching from a first cell to a second cell; in a case of cellular network coverage, the second terminal is in a connected state, and the second terminal receives different RRC signalings, and the different RRC signalings include different Access Stratum configurations; in a case of cellular network coverage, the second terminal switches from an Idle state or an Inactive state to a connected state, or switches from a connected state to an Idle state or an Inactive state.

That is to say, the second terminal may determine that there is change in an Access Stratum parameter when switching between different scenarios or switching between different states.

In the embodiment of the present application, when there is change in an Access Stratum parameter, the second terminal triggers at least one of the following processes to configure the Access Stratum parameter: a PDCP reconstruction process or a PDCP data recovery process; an RLC reconstruction process; a MAC resetting process; and a full configuration process.

The following description will take an example that when there is change in an Access Stratum parameter, execution of a full configuration process is triggered to configure the Access Stratum parameter, but the embodiment of the present application is not limited to this.

Optionally, in an embodiment of the present application, the method 300 further includes: the second terminal determines the first indication information according to pre-configured information and/or configuration information from a network device.

As an example, when the second terminal moves between an area with network coverage and an area without network coverage, the second terminal determines, according to the pre-configured information and the configuration information from the network device, the first indication information.

In this embodiment of the present application, in an area without network coverage, a terminal device may obtain an Access Stratum parameter configuration according to pre-configured information, and in an area with network coverage, the terminal device may obtain the Access Stratum parameter configuration according to configuration information from a network device, such as a system message or a dedicated signaling. The dedicated signaling here may include an RRC signaling, or a MAC CE.

It should be understood that in the embodiment of the present application, the pre-configured information may be preset on the terminal device, for example, preset in a SIM card of the terminal device.

For example, if the second terminal moves from an area A with network coverage to an area B without network coverage, the second terminal may determine the first indication information according to pre-configured information. As an example, the first indication information may include a change situation of an Access Stratum parameter of the second terminal, for example, the first indication information may include a changed parameter configuration or a change amount of a changed parameter. Upon receiving the first indication information, the first terminal may trigger to perform the full configuration process to update an Access Stratum parameter according to parameter change indicated by the first indication information. As another example, if the second terminal moves from the area A with network coverage to the area B without network coverage, the second terminal may determine that there is change in an Access Stratum parameter, and may further explicitly indicate the first terminal to perform the full configuration process to update the Access Stratum parameter through the first indication information.

For another example, if the second terminal moves from the area B without network coverage to the area A with network coverage, the second terminal may determine the first indication information according to configuration information from a network device. As an example, the first indication information may include a change situation of an Access Stratum parameter of the second terminal, for example, the first indication information may include a changed parameter configuration or a change amount of a changed parameter. Upon receiving the first indication information, the first terminal may trigger to perform the full configuration process to update the Access Stratum parameter according to parameter change indicated by the first indication information. As another example, if the second terminal moves from the area B without network coverage to the area A with network coverage, the second terminal may determine that there is change in an Access Stratum parameter, and may further explicitly indicate the first terminal to perform the full configuration process to update the Access Stratum parameter through the first indication information.

As another embodiment, if the second terminal is in an Idle state or an Inactive state, and the second terminal performs cell reselection, the second terminal determines, according to system information from the network device, the first indication information.

For example, if the second terminal reselects from a cell A to a cell B, the second terminal may obtain system information from the cell B. If an Access Stratum parameter configuration included in system information from the cell A and the system information from the cell B changes, the second terminal may determine the first indication information according to the system information from the cell B. As an example, the first indication information may include a change situation of an Access Stratum parameter of the second terminal. For example, the first indication information may include a parameter configuration in a system message from the cell B air a change amount of a parameter configuration in a system message from the cell B relative to a parameter configuration in a system message from the cell A. As another example, when the second terminal reselects from a cell A to a cell B, the second terminal may determine that there is change in an Access Stratum parameter, and may further indicate the first terminal to perform the full configuration process to update the Access Stratum parameter through the first indication information.

As another embodiment, if the second terminal is in a connected state, the second terminal determines, according to a dedicated signaling from the network device, the first indication information.

For example, if the second terminal receives a first dedicated signaling and then receives a second dedicated signaling, and if an Access Stratum parameter configuration included in the first dedicated signaling and the second dedicated signaling changes, the second terminal may determine the first indication information according to the parameter configuration included in the first dedicated signaling and the second dedicated signaling or according to the second dedicated signaling. As an example, the first indication information may include change in parameter configuration of the second terminal, for example, the first indication information may include a changed parameter configuration or a change amount of a changed parameter configuration, And as another example, the first indication information may indicate the first terminal to perform the full configuration process to update an Access Stratum parameter.

Optionally, in some embodiments, the dedicated signaling is used for indicating the second terminal to perform at least one of the following: a PDCP reconstruction process or a PDCP data recovery process; RLC reconstruction process; a MAC resetting process; and a full configuration process.

That is to say, when there is change in an Access Stratum parameter configured to a terminal device by a network device, the network device may trigger the second terminal to perform the above processes to update or reconfigure a parameter.

Optionally, in some embodiments, the full configuration process includes at least one of: releasing at least one of current dedicated radio configurations; releasing at least one of all current common radio configurations; applying a default configuration of at least one Access Stratum parameter; releasing at least one Service Data Adaptation Protocol (SDAP) entity; and releasing at least one bearer.

Optionally, in some embodiments, the releasing at least one of the current dedicated radio configurations includes: releasing other dedicated radio configurations other than a specific configuration in the current dedicated radio configurations, wherein the specific configuration includes a Cell Radio Network Temporary Identity (C-RNTI) of a Master Cell Group (MCG) and an Access Stratum (AS) security configuration associated with a master key.

Optionally, in some embodiments, the default configuration of the at least one Access Stratum parameter is pre-defined, pre-configured, or configured through a system message.

It should be understood that specific implementation of the above-mentioned full configuration process may be referred to the relevant description in the embodiment shown in FIG. 2, and will not be repeated here.

Optionally, in some embodiments, first indication information is used for indicating the first terminal to perform at least one of the following processes: a Packet Data Convergence Protocol (PDCP) reconstruction process or a PDCP data recovery process; a Radio Link Control (RLC) reconstruction process; a Media Access Control (MAC) resetting process; and a full configuration process.

Optionally, in some embodiments, the first indication information is used for indicating change of at least one of the following parameters: a SDAP parameter, a PDCP parameter, and an RLC parameter.

Optionally, in some embodiments, the SDAP parameter includes at least one of the following: a Protocol Data Unit (PDU) session identifier, a SDAP header configuration, a default data bearer, and a mapping relationship from data streams to bearers.

Optionally, in some embodiments, the PDCP parameter includes at least one of the following: a PDCP serial number size, a PDCP header compression configuration, an integrity protection configuration, and an encryption and decryption configuration.

Optionally, in some embodiments, the RLC parameter includes at least one of the following: an RLC mode, an RLC serial number length, and a logical channel identity (ID).

Hereinafter, a wireless communication method according to an embodiment of the present application will be described from perspective of device interaction with reference to FIGS. 4 to 5.

As shown in FIG. 4, the method includes the following acts.

In S21, a second terminal may obtain configuration 1 from a network device; in this case, the second terminal may be located in an area with network coverage.

In addition, in S22, the second terminal sends an Access Stratum configuration to a first terminal wherein the Access Stratum configuration may include the configuration 1.

In S23, the first terminal and the second terminal may use configuration 1 for data transmission.

Thereafter, the second terminal enters an area without network coverage, and in S24, the second terminal obtains configuration 2 from pre-configured information.

If the configuration 1 and the configuration 2 are different configurations, then in S25, the second terminal may perform a full configuration process to update the Access Stratum configuration from configuration 1 to configuration 2.

In S26, the second terminal sends first indication information to the first terminal, wherein the first indication information may indicate the first terminal to perform a full configuration process.

Optionally, the first indication information may further include the configuration 2 or change of the configuration 2 relative to the configuration 1.

In S27, the first terminal performs a full configuration process to update the Access Stratum configuration from configuration 1 to configuration 2.

Further, in S28, the first terminal and the second terminal may use configuration 2 for data transmission.

Figure 5:
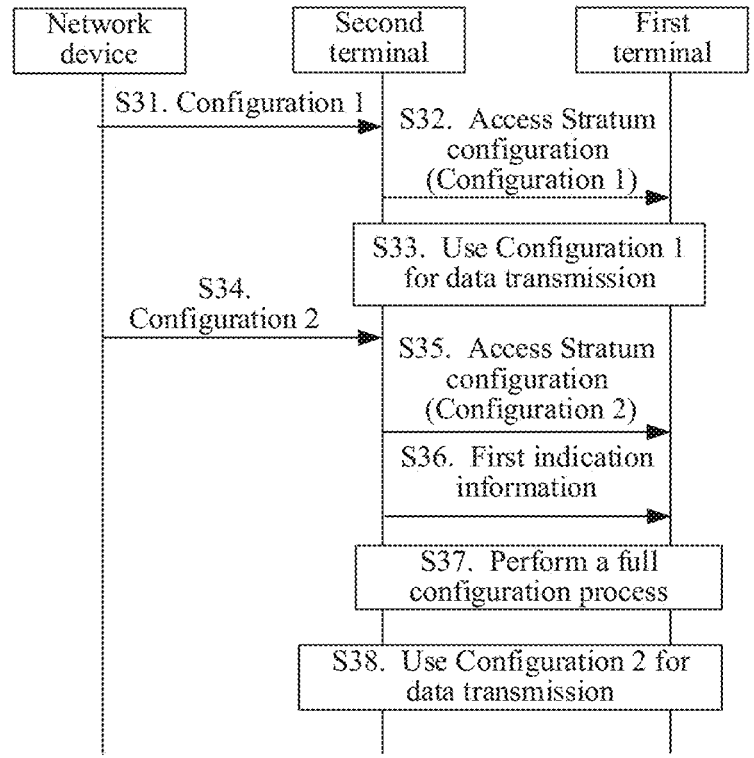
FIG. 5 is a schematic interaction diagram of another wireless communication method according to an embodiment of the present application.

As shown in FIG. 5, the method includes the following acts.

In S31, a second terminal may obtain configuration 1 from a network device.

Specifically, the second terminal may receive a first dedicated signaling from a network device, and the first dedicated signaling includes the configuration 1.

In this case, the second terminal may be located in an area with network coverage.

Further, in S32, the second terminal sends an Access Stratum configuration to a first terminal, wherein the Access Stratum configuration may include the configuration 1.

In S33, the first terminal and the second terminal may use configuration 1 for data transmission.

In S34, the second terminal obtains configuration 2 from a network device.

Specifically, the second terminal may receive a second dedicated signaling from the network device, and the second dedicated signaling includes the configuration 2.

If the configuration I and the configuration 2 are different configurations, the second terminal may update an Access Stratum configuration from configuration 1 to configuration 2.

In S35, the second terminal sends an Access Stratum configuration to the first terminal, wherein the Access Stratum configuration includes the configuration 2, Optionally, the first terminal may perform a full configuration process based on the configuration 2 to update from the configuration 1 to the configuration 2.

Or, in some other embodiments, in S36, the second terminal may send first indication information to the first terminal, wherein the first indication information may explicitly indicate the first terminal to perform a full configuration process.

In S37, the first terminal performs a full configuration process to update an Access Stratum configuration from configuration 1 to configuration 2.

Further, in S38, the first terminal and the second terminal may use configuration 2 for data transmission.

Method embodiments of the present application are described in detail above with reference to FIGS. 2 to 5, device embodiments of the present application will be described in detail below with reference to FIGS. 6 to 9. It should be understood that the device embodiments and the method embodiments correspond to each other, and description of the method embodiments may be referred to for similar description of the apparatus embodiments.

Figure 6:
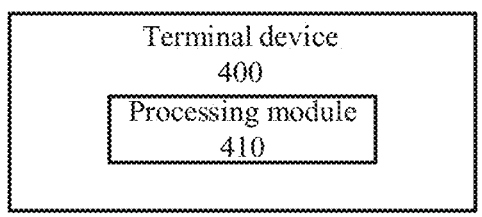
FIG. 6 is a schematic block diagram of a terminal device according to an embodiment of the present application.

FIG. 6 is a schematic block diagram of a terminal device 400 according to an embodiment of the present application. As shown in FIG. 6, the terminal device 400 includes a processing module 410.

The processing module 410 is configured to trigger at least one of the following processes to configure an Access Stratum parameter according to first indication information sent by a second terminal: a Packet Data Convergence Protocol (PDCP) reconstruction process or a. PDCP data recovery process: a Radio Link Control (RLC) reconstruction process; a Media Access Control (MAC) resetting process; and a full configuration process.

Optionally, in some embodiments, the full configuration process includes at least one of: releasing at least one of current dedicated radio configurations; releasing at least one of all current common radio configurations; applying a default configuration of at least one Access Stratum parameter; releasing at least one Service Data Adaptation Protocol (SDAP) entity; and releasing at least one bearer.

Optionally, in some embodiments, the releasing at least one of the current dedicated radio configurations includes: releasing other dedicated radio configurations other than a specific configuration in the current dedicated radio configurations, wherein the specific configuration includes a Cell Radio Network Temporary Identity (C-RNTI) of a Master Cell Group (MCG) and/or an Access Stratum (AS) security configuration associated with a master key.

Optionally, in some embodiments, the default configuration of the at least one Access Stratum parameter is pre-defined, pre-configured, or configured through a system message.

Optionally, in some embodiments, first indication information is used for indicating the first terminal to perform at least one of the following processes: a Packet Data Convergence Protocol (PDCP) reconstruction process or a PDCP data recovery process; a Radio Link Control (RLC) reconstruction process; a Media Access Control (MAC) resetting process; and a full configuration process.

Optionally, in some embodiments, the first indication information is used for indicating change of at least one of the following parameters: a SDAP parameter, a PDCP parameter, and an RLC parameter.

Optionally, in some embodiments, the SDAP parameter includes at least one of the following: a Protocol Data Unit (PDU) session identifier, a SDAP header configuration, a default data bearer, and a mapping relationship from data streams to bearers.

Optionally, the PDCP parameter includes at least one of the following: a PDCP serial number size, a PDCP header compression configuration, an integrity protection configuration, and an encryption and decryption configuration.

Optionally, in some embodiments, the RLC parameter includes at least one of the following: an RLC mode, an RLC serial number length, and a logical channel identity (ID).

Optionally, in some embodiments, the processing module may be one or more processors.

It should be understood that the terminal device 400 according to the embodiment of the present application may correspond to the terminal device in the method embodiments of the present application, and the above-mentioned and other operations and/or functions of various units in the terminal device 400 are respectively for implementing the corresponding processes of the first terminal in aforementioned embodiments, which will not be repeated here for brevity.

Figure 7:
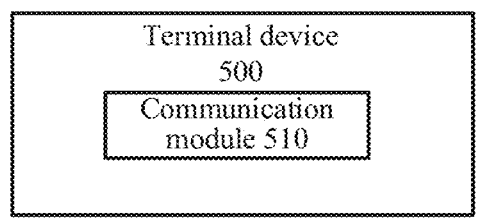
FIG. 7 is a schematic block diagram of another terminal device according to an embodiment of the present application.

FIG. 7 is a schematic block diagram of a terminal device 500 according to an embodiment of the present application. As shown in FIG. 7, the terminal device 500 includes a communication module 510.

The communication module 510 is configured to send first indication information to a first terminal when there is change in an Access Stratum parameter, wherein the first indication information is used for triggering the first terminal to configure the Access Stratum parameter by performing at least one of the following: a Packet Data Convergence Protocol (PDCP) reconstruction process or a PDCP data recovery process; a Radio Link Control (RLC) reconstruction process; a Media Access Control (MAC) resetting process; and a full configuration process.

Optionally, in some embodiments, the terminal device further includes: a processing module, configured to, when there is change in an Access Stratum parameter, trigger at least one of the following processes to configure an Access Stratum parameter: a PDCP reconstruction process or a PDCP data recovery process; an RLC reconstruction process; a MAC resetting process; and a full configuration process.

Optionally, in some embodiments, the processing module is further configured to: determine, according to pre-configured information and/or configuration information from a network device, the first indication information.

Optionally, in some embodiments, the processing module is specifically configured to: determine the first indication information according to the pre-configured information and the configuration information from the network device if the terminal device moves between an area with network coverage and an area without network coverage.

Optionally, in some embodiments, the communication module 510 is further configured to: send the first indication information to the first terminal, wherein the first indication information is used for indicating the first terminal to perform a full configuration process.

Optionally, the configuration information from the network device is from at least one of the following: a system message from the network device and a dedicated signaling from the network device.

Optionally, in some embodiments, the processing module is further configured to: determine the first indication information according to the system information from the network device if the terminal device is in an Idle state or an Inactive state and performs cell reselection.

Optionally, in some embodiments, the communication module 510 is further configured to: send the first indication information to the first terminal, wherein the first indication information is used for indicating the first terminal to perform a full configuration process.

Optionally, in some embodiments, the processing module is further configured to: determine the first indication information according to the dedicated signaling from the network device if the terminal device is in a connected state.

Optionally, in some embodiments, the dedicated signaling is used for indicating the terminal device to perform at least one of the following: a PDCP reconstruction process or a PDCP data recovery process, an RLC reconstruction process, a MAC resetting process, and a full configuration process.

Optionally, in some embodiments, the full configuration process includes at least one of: releasing at least one of current dedicated radio configurations; releasing at least one of all current common radio configurations applying a default configuration of at least one Access Stratum parameter; releasing at least one Service Data Adaptation Protocol (SDAP) entity; and releasing at least one bearer.

Optionally, the releasing at least one of the current dedicated radio configurations includes: releasing other dedicated radio configurations other than a specific configuration in the current dedicated radio configurations, wherein the specific configuration includes a Cell Radio Network Temporary Identity (C-RNTI) of a Master Cell Group (MCG) and an Access Stratum (AS) security configuration associated with a master key.

Optionally, in some embodiments, the default configuration of the at least one Access Stratum parameter is pre-defined, pre-configured, or configured through a system message.

Optionally, the first indication information is used for indicating the first terminal to perform at least one of the following processes: a Packet Data Convergence Protocol (PDCP) reconstruction process or a PDCP data recovery process, a Radio Link Control (RLC) reconstruction process, a Media Access Control (MAC) resetting process, and a full configuration process.

Optionally, in some embodiments, the first indication information is used for indicating change of at least one of the following parameters: a SDAP parameter, a PDCP parameter, and an RLC parameter.

Optionally, the SDAP parameter includes at least one of the following: a Protocol Data. Unit (PDU) session identifier, a SDAP header configuration, a default data bearer, and a mapping relationship from data streams to bearers.

Optionally, the PDCP parameter includes at least one of the following: a PDCP serial number size, a PDCP header compression configuration, an integrity protection configuration, and an encryption and decryption configuration.

Optionally, in some embodiments, the RLC parameter includes at least one of the following: an RLC mode, an RLC serial number length, and a logical channel identity (ID).

Optionally, in some embodiments, the communication module may be a communication interface or a transceiver, or an input and output interface of a communication chip or a system on a chip. The above processing module may be one or more processors.

It should be understood that the terminal device 500 according to the embodiment of the present application may correspond to the terminal device in the method embodiments of the present application, and the above-mentioned and other operations and/or functions of various units in the terminal device 500 are respectively for implementing the corresponding processes of the second terminal in aforementioned embodiments, which will not be repeated here for brevity.

Figure 8:
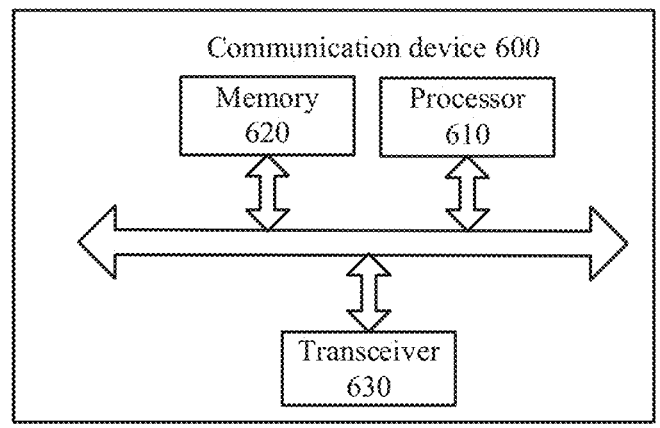
FIG. 8 is a schematic block diagram of a communication device according to another embodiment of the present application.

FIG. 8 is a schematic diagram of a structure of a communication device 600 according to an embodiment of the present application. The communication device 600 shown in FIG. 8 includes a processor 610, which may call and run a computer program from a memory to implement the methods in the embodiments of the present application.

Optionally, as shown in FIG. 8, the communication device 600 may further include a memory 620. Herein, the processor 610 may call and run a computer program from the memory 620 to implement the methods in the embodiments of the present application.

Herein, the memory 620 may be a separate device independent of the processor 610, or may be integrated in the processor 610.

Optionally, as shown in FIG. 8, the communication device 600 may further include a transceiver 630, and the processor 610 may control the transceiver 630 to communicate with other devices. Specifically, the transceiver 730 may send information or data to other devices or receive information or data sent by other devices.

Herein, the transceiver 630 may include a transmitter and a receiver. The transceiver 630 may further include antennas, a quantity of which may be one or more.

Optionally, the communication device 600 may be specifically the network device according to the embodiments of the present application, and the communication device 600 may implement the corresponding processes implemented by the network device in various methods in the embodiments of the present application, which will not be repeated here for brevity.

Optionally, the communication device 600 may be specifically the mobile terminal/terminal device according to the embodiments of the present application, and the communication device 600 may implement the corresponding processes implemented by the mobile terminal/terminal device in various methods in the embodiments of the present application, which will not be repeated here for brevity.

Figure 9:
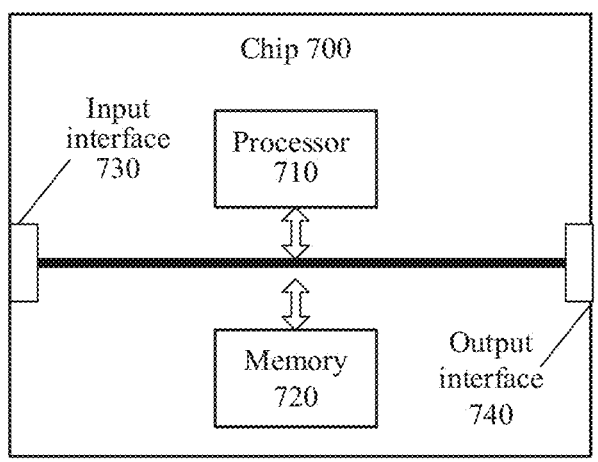
FIG. 9 is a schematic block diagram of a chip according to an embodiment of the present application.

FIG. 9 is a schematic diagram of a structure of a chip according to an embodiment of the present application. A chip 700 shown in FIG. 9 includes a processor 710 that may call and run a computer program from a memory to implement the methods in the embodiments of the present application.

Optionally, as shown in FIG. 9, the chip 700 may further include a memory 720. Herein, the processor 710 may call and run a computer program from the memory 720 to implement the methods in the embodiments of the present application.

Herein, the memory 720 may be a separate device independent of the processor 710, or may be integrated in the processor 710.

Optionally, the chip 700 may further include an input interlace 730. Herein, the processor 710 may control the input interface 730 to communicate with other devices or chips. Specifically, the processor 710 may acquire information or data sent by other devices or chips.

Optionally, the chip 700 may further include an output interface 740. Herein, the processor 710 may control the output interface 740 to communicate with other devices or chips. Specifically, the processor 710 may output information or data to other devices or chips.

Optionally, the chip may be applied to the network device in the embodiments of the present application, and the chip may implement the corresponding flow implemented by the network device in the various methods in the embodiments of the present application, which will not be repeated here for brevity.

Optionally, the chip may be applied to the mobile terminal/terminal device in the embodiments of the present application, and the chip may implement the corresponding flow implemented by the mobile terminal/terminal device in the various methods in the embodiments of the present application, which will not be repeated here for brevity.

It should be understood that the chip mentioned in the embodiments of the present application may also be referred to as a system-level chip, a system chip, a chip system, or a system chip on a chip, etc.

It should be understood that the processor in the embodiments of the present application may be an integrated circuit chip with a capability for processing signals. In an implementation process, various acts of the method embodiments described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement various methods, acts, and logic block diagrams disclosed in the embodiments of the present application. The general purpose processor may be a microprocessor or the processor may be any conventional processor or the like. The acts of the methods disclosed in connection with the embodiments of the present application may be directly embodied by execution of a hardware decoding processor, or by execution of a combination of hardware and software modules in a decoding processor. The software modules may be located in a storage medium mature in the field, such as a Random Access Memory, a flash memory, a Read-Only Memory, a Programmable Read-Only Memory, or an electrically erasable programmable memory, or a register. The storage medium is located in a memory, and a processor reads information in the memory and completes the acts of the above methods in combination with its hardware.

It should be understood that the memory in the embodiments of the present application may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data. Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the embodiments of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the embodiments of the present application are intended to include, but are not limited to, these and any other suitable types of memories.

An embodiment of the present application further provides a computer readable storage medium, configured to store a computer program.

Optionally, the computer readable storage medium may be applied to the network device in the embodiments of the present application, and the computer program enables a computer to perform the corresponding processes implemented by the network device in various methods according to the embodiments of the present application, which will not be repeated here for brevity.

Optionally, the computer readable storage medium may be applied to the mobile terminal/terminal device in the embodiments of the present application, and the computer program enables a computer to perform the corresponding processes implemented by the mobile terminal/terminal device in various methods according to the embodiments of the present application, which will not be repeated here for brevity.

An embodiment of the present application further provides a computer program product, including computer program instructions.

Optionally, the computer program product may be applied to the network device in the embodiments of the present application, and the computer program instructions enable a computer to perform the corresponding processes implemented by the network device in various methods according to the embodiments of the present application, which will not be repeated here for brevity.

Optionally, the computer program product may be applied to the mobile terminal/terminal device in the embodiments of the present application, and the computer program instructions enable a computer to perform the corresponding processes implemented by the mobile terminal/terminal device in various methods according to the embodiments of the present application, which will not be repeated here for brevity.

An embodiment of the present application further provides a computer program.

Optionally, the computer program may be applied to the network device in the embodiments of the present application. When the computer program is run on a computer, the computer is enabled to perform the corresponding processes implemented by the network device in various methods according to the embodiments of the present application, which will not be repeated here for brevity.

Optionally, the computer program may be applied to the mobile terminal/terminal device in the embodiments of the present application. When the computer program is run on a computer, the computer is enabled to perform the corresponding processes implemented by the mobile terminal/terminal device in various methods according to the embodiments of the present application, which will not be repeated here for brevity.

Those of ordinary skill in the art will recognize that units and algorithm acts of various examples described in connection with the embodiments disclosed herein may be implemented in electronic hardware, or a combination of computer software and electronic hardware. Whether these functions are implemented in a form of hardware or software depends on a specific application and a design constraint of a technical solution. Skilled in the art may use different methods to implement the described functions for each particular application, but such implementation should not be considered to be beyond the scope of the present application.

Those skilled in the art may clearly understand that for convenience and conciseness of description, specific working processes of the systems, apparatuses, and units described above may refer to the corresponding processes in the aforementioned method embodiments, and details will not be repeated here.

In several embodiments according to the present application, it should be understood that the disclosed systems, apparatuses, and methods may be implemented in other ways. For example, the apparatus embodiments described above are only illustrative, for another example, a division of the units is only a logical function division, and there may be other division manners in actual implementation. For example, multiple units or components may be combined or integrated into another system, or some features may be ignored or not executed. In addition, mutual coupling or direct coupling or communication connection shown or discussed may be indirect coupling or communication connection through some interfaces, apparatuses, or units, and may be in electrical, mechanical, or other forms.

The units described as separated components may or may not be physically separated, and components shown as units may or may not be physical units, i.e., they may be located in one place or may be allocated over multiple network units. Some or all of the units may be selected according to practical needs to achieve purposes of solutions of the embodiments.

In addition, various functional units in various embodiments of the present application may be integrated in one processing unit, or various units may be physically present separately, or two or more units may be integrated in one unit.

The functions may be stored in a computer readable storage medium if implemented in a form of a software functional unit and sold or used as a separate product. Based on this understanding, technical solutions of the present application, in essence, or a part contributing to the existing art, or part of the technical solutions, may be embodied in a form of a software product stored in a storage medium, including several instructions for enabling a computer device (which may be a personal computer, a server, or a network device, etc.) to perform all or part of the acts of the methods described in various embodiments of the present application. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific embodiments of the present application, but the protection scope of the present application is not limited thereto. Any person skilled in the art may easily conceive variations or substitutions within the technical scope disclosed by the present application, which should be included within the protection scope of the present application. Therefore, the protection scope of the present application should be subject to the protection scope of the claims.

The invention claimed is:

1. A wireless communication method, comprising:
   triggering, by a first terminal, a full configuration process to configure an Access Stratum parameter according to first indication information sent by a second terminal; wherein the first indication information is carried in a Radio Resource Control (RRC) signaling;
   wherein the first indication information is a specific bit in the RRC signaling;
   wherein when a value of the specific bit is 0, it indicates that the first terminal is not triggered to perform the full configuration process; and when the value of the specific bit is 1, it indicates that the first terminal is triggered to perform the full configuration process.

2. The method according to claim 1, wherein the full configuration process comprises at least one of the following:
   releasing at least one of current dedicated radio configurations;
   releasing at least one bearer; and
   a Media Access Control (MAC) resetting process.

3. The method according to claim 2, wherein the releasing at least one of the current dedicated radio configurations, comprises:
   releasing other dedicated radio configurations other than a specific configuration in the current dedicated radio configurations.

4. The method according to claim 1, wherein the first indication information is used for indicating the first terminal to perform the full configuration process.

5. A terminal device, comprising:
   a processor, configured to trigger a full configuration process to configure an Access Stratum parameter according to first indication information sent by a second terminal; wherein the first indication information is carried in a Radio Resource Control (RRC) signaling; wherein the first indication information is a specific bit in a Radio Resource Control (RRC) signaling; wherein when a value of the specific bit is 0, it indicates that the terminal device is not triggered to perform the full configuration process; and when the value of the specific bit is 1, it indicates that the terminal device is triggered to perform the full configuration process.

6. The terminal device according to claim 5, wherein the full configuration process comprises at least one of the following:
   releasing at least one of current dedicated radio configurations;
   releasing at least one bearer; and
   a Media Access Control (MAC) resetting process.

7. The terminal device according to claim 6, wherein the releasing at least one of the current dedicated radio configurations, comprises:
   releasing other dedicated radio configurations other than a specific configuration in the current dedicated radio configurations.

8. The terminal device according to claim 7, wherein the specific configuration comprises a Cell Radio Network Temporary Identity (C-RNTI) of a Master Cell Group (MCG) and/or an Access Stratum (AS) security configuration associated with a master key.

9. A terminal device, comprising:
   a transmitter, configured to send first indication information to a first terminal when there is change in an Access Stratum parameter, wherein the first indication information is used for triggering the first terminal to perform a full configuration process to configure an Access Stratum parameter; wherein the first indication information is carried in a Radio Resource Control (RRC) signaling; wherein the first indication information is a specific bit in a Radio Resource Control (RRC) signaling; wherein when a value of the specific bit is 0, it indicates that the terminal device is not triggered to perform the full configuration process; and when the value of the specific bit is 1, it indicates that the terminal device is triggered to perform the full configuration process.

10. The terminal device according to claim 9, wherein the full configuration process comprises at least one of the following:
    releasing at least one of current dedicated radio configurations;
    releasing at least one bearer; and
    a Media Access Control (MAC) resetting process.

11. The terminal device according to claim 10, wherein the releasing at least one of the current dedicated radio configurations, comprise:
    releasing other dedicated radio configurations other than a specific configuration in the current dedicated radio configurations.

12. The terminal device according to claim 9, wherein the first indication information is used for indicating the first terminal to perform the full configuration process.

* * * * *